(12) United States Patent
Keresman, III et al.

(10) Patent No.: US 10,937,026 B2
(45) Date of Patent: Mar. 2, 2021

(54) SYSTEM AND METHOD FOR TOKENIZATION

(71) Applicant: CardinalCommerce Corporation, Mentor, OH (US)

(72) Inventors: Michael A. Keresman, III, Kirtland Hills, OH (US); Chandra Balasubramanian, Shaker Heights, OH (US); Gary Bender, San Rafael, CA (US); Mark Carlson, Half Moon Bay, CA (US); Ed Katzin, Hillsborough, CA (US); Francis M. Sherwin, Cleveland Heights, OH (US)

(73) Assignee: CardinalCommerce Corporation, Mentor, OH (US)

( * ) Notice: Subject to any disclaimer, the term of this patent is extended or adjusted under 35 U.S.C. 154(b) by 44 days.

(21) Appl. No.: 16/266,571

(22) Filed: Feb. 4, 2019

(65) Prior Publication Data
US 2019/0172061 A1    Jun. 6, 2019

Related U.S. Application Data

(63) Continuation of application No. 15/213,197, filed on Jul. 18, 2016, now Pat. No. 10,235,671.
(Continued)

(51) Int. Cl.
*G06Q 20/40*  (2012.01)
*G06Q 20/02*  (2012.01)
(Continued)

(52) U.S. Cl.
CPC ............ *G06Q 20/40* (2013.01); *G06Q 20/02* (2013.01); *G06Q 20/382* (2013.01); *G06Q 20/385* (2013.01); *H04L 63/0428* (2013.01)

(58) Field of Classification Search
CPC ...... G06Q 20/40; G06Q 20/02; G06Q 20/382; G06Q 20/385; H04L 63/0428
(Continued)

(56) References Cited

U.S. PATENT DOCUMENTS 5,883,810 A * 3/1999 Franklin ................. G06Q 20/02
                                                                 235/379
9,219,716 B2 * 12/2015 Mattsson ................ G07F 7/084
(Continued)

*Primary Examiner* — Robert R Niquette
(74) *Attorney, Agent, or Firm* — The Webb Law Firm

(57) ABSTRACT

A method for obscuring a value of a sensitive data element includes: (a) receiving the sensitive data element, the sensitive data element being received over a data communications network (110) at a hardware computing device (142) of a trusted tokenization service provider (140); (b) generating a token corresponding to the received sensitive data element; (c) storing the token and sensitive data element in a memory device (146) such that they are correlated with one another; (d) providing the generated token to a first party (130) that uses the token in place of the sensitive data element in a request for authorization to complete a transaction, the request being sent from the first party (130); (e) intercepting the request for authorization including the token; (f) using the token contained in the intercepted request to look-up and retrieve the correlated sensitive data element in the memory device (160); (g) replacing the token contained in the request with the sensitive data element retrieved from the memory device (160); and (h) forwarding the request containing the sensitive data element to a second party (160 and/or 162) which employs the sensitive data element to determine whether completion of the transaction should be authorized or declined.

16 Claims, 9 Drawing Sheets

Related U.S. Application Data

(60) Provisional application No. 62/193,641, filed on Jul. 17, 2015.

(51) Int. Cl.
*G06Q 20/38* (2012.01)
*H04L 29/06* (2006.01)

(58) Field of Classification Search
USPC .......................................... 705/44
See application file for complete search history.

(56) References Cited

U.S. PATENT DOCUMENTS

| | | | |
|---|---|---|---|
| 9,280,765 B2* | 3/2016 | Hammad | G06Q 20/382 |
| 9,342,832 B2* | 5/2016 | Basu | G06Q 20/38215 |
| 9,514,457 B2* | 12/2016 | Mattsson | G06Q 20/405 |
| 2007/0226152 A1* | 9/2007 | Jones | G06Q 20/383 |
| | | | 705/74 |
| 2012/0005038 A1* | 1/2012 | Soman | G06Q 30/0613 |
| | | | 705/26.41 |
| 2012/0259782 A1* | 10/2012 | Hammad | G06Q 20/382 |
| | | | 705/44 |
| 2014/0108172 A1* | 4/2014 | Weber | G06Q 20/20 |
| | | | 705/17 |
| 2015/0127547 A1 | 5/2015 | Powell et al. | |
| 2015/0161596 A1* | 6/2015 | McCarthy | G06Q 20/204 |
| | | | 705/67 |
| 2015/0199689 A1* | 7/2015 | Kumnick | G06Q 20/4016 |
| | | | 705/67 |
| 2018/0285864 A1* | 10/2018 | Dill | G06Q 20/40 |

\* cited by examiner

SYSTEM AND METHOD FOR TOKENIZATION

This application is a continuation of U.S. application Ser. No. 15/213,197, filed Jul. 18, 2016, which claims the benefit of U.S. Provisional Patent Application No. 62/193,641, filed Jul. 17, 2015, the disclosures of which are incorporated herein by reference in their entireties.

BACKGROUND

The subject matter of the present specification generally relates to the art of data security. Exemplary embodiments disclosed herein find particular application in conjunction with the secure processing of commercial and/or other like transactions over an open or public telecommunications network, e.g., such as the Internet and/or other like packet and/or data networks, and they will be described herein with particular reference thereto. However, it is to be appreciated that various exemplary embodiments such as those disclosed herein are also amenable to other like applications.

In the field of data security, tokenization generally refers to a process whereby a real data element is replaced with a surrogate or substitute that is commonly referred to as a token. Generally, it is desirable to keep the value of the real data element secret or otherwise provide only limited access thereto to particular selected entities. Conventionally, the value of the token by itself may have no specific or readily discernable meaning. Rather, the token is merely a reference or identifier that correlates, via a tokenization system, to the real data. Conventionally, one cannot readily determine or otherwise obtain the value of the real data element from the token absent access to the tokenization system.

Disclosed herein are a new and/or improved system and/or method for tokenization.

BRIEF DESCRIPTION

This Brief Description is provided to introduce concepts related to the present specification. It is not intended to identify essential features of the claimed subject matter nor is it intended for use in determining or limiting the scope of the claimed subject matter. The exemplary embodiments described below are not intended to be exhaustive or to limit the claims to the precise forms disclosed in the following Detailed Description. Rather, the embodiments are chosen and described so that others skilled in the art may appreciate and understand the principles and practices of the subject matter presented herein.

In accordance with one exemplary embodiment, there is provided a method for obscuring a value of a sensitive data element. The method includes:
  (a) receiving the sensitive data element, the sensitive data element being received over a data communications network at a hardware computing device of a trusted tokenization service provider;
  (b) generating a token corresponding to the received sensitive data element;
  (c) storing the token and sensitive data element in a memory device such that they are correlated with one another;
  (d) providing the generated token to a first party that uses the token in place of the sensitive data element in a request for authorization to complete a transaction, the request being sent from the first party;
  (e) intercepting the request for authorization including the token;
  (f) using the token contained in the intercepted request to look-up and retrieve the correlated sensitive data element in the memory device;
  (g) replacing the token contained in the request with the sensitive data element retrieved from the memory device; and
  (h) forwarding the request containing the sensitive data element to a second party which employs the sensitive data element to determine whether completion of the transaction should be authorized or declined.

In accordance with another exemplary embodiment, a system is provided for obscuring a value of a sensitive data element. The system includes: a first hardware server in operative communication with a data communications network, the first hardware server being operated by a trusted tokenization service provider and operative to receive the sensitive data element over said data communications network; a token generator, the token generator generating a token corresponding to the sensitive data element in response to the first hardware server receiving the sensitive data element; and a memory device that stores the generated token and the sensitive data element received by the first hardware server such that they are correlated with one another. The first hardware server is further provisioned to: provide the generated token to a second server over the data communications network, the second server being operated by a first party that uses the token in place of the sensitive data element in a request for authorization to complete a transaction, the request being sent from the second server; receive the request for authorization including the token sent from the second server; use the token contained in the request to look-up and retrieve the correlated sensitive data element in the memory device; replace the token contained in the request with the sensitive data element retrieved from the memory device; and forward the request containing the sensitive data element to a third hardware server of a second party which employs the sensitive data element to determine whether completion of the transaction should be authorized or declined.

Numerous advantages and benefits of the subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation.

BRIEF DESCRIPTION OF THE DRAWINGS

The following Detailed Description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION

Figure 1:
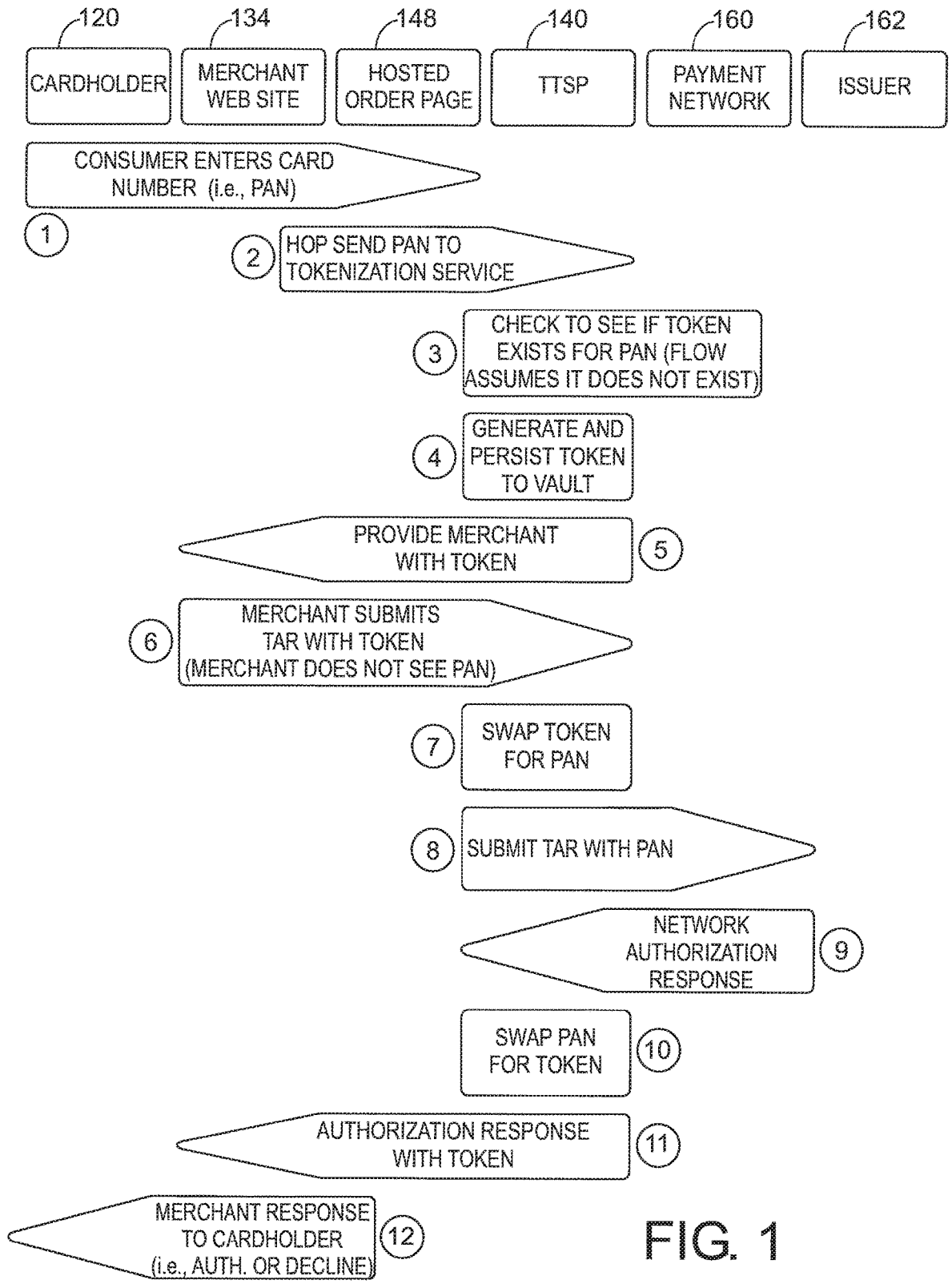
FIG. 1 is a diagrammatic illustration showing message and/or signal flows in accordance with one exemplary process and/or method for tokenization of a PAN in accordance with aspects of the present inventive subject matter.

For clarity and simplicity, the present specification shall refer to structural and/or functional elements, relevant standards, algorithms and/or protocols, and other components, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

Generally, security and risk reduction benefits of tokenization as disclosed herein are realized when the tokenization system is logically isolated and segmented from data processing systems and applications that otherwise would have processed or stored sensitive data replaced by tokens. It is generally desirable that the tokenization system can tokenize data to create tokens and/or de-tokenize tokens back to redeem sensitive data under strict security controls. In practice, the token generation method suitably has the property that there is no readily feasible way, e.g., through direct attack, cryptanalysis, side channel analysis, token mapping table exposure or brute force techniques, to reverse tokens back to live or real data (that is, absent utilization of the tokenization system).

In practice, tokens replace live or real data in selected systems, components, processes and/or applications, thereby resulting in minimized exposure of sensitive data to those applications, stores, people and processes, and/or reducing the risk of compromise or accidental exposure and/or unauthorized access to the sensitive live or real data represented by the tokens. Applications suitably operate using tokens instead of live or real data, with the exception of a small number of trusted applications explicitly permitted to de-tokenize token (i.e., to recover or otherwise obtain the corresponding live or real data) when strictly necessary for an approved purpose.

In general, there is disclosed herein a system and/or method for tokenizing a primary account number (PAN) or the like used in connection with a commercial or other like transaction executed over a telecommunications network. In practice, the telecommunications network is a data and/or packet switched network that may be generally public and/or open, e.g., such as the Internet.

While referred to as a "primary account number" for the purpose of simplicity herein, it is to be appreciated that the PAN is not strictly limited to a number per se but rather it may be any credential associated with and/or identifying a payment account and/or payment instrument of a user. Without limitation, for example, the credential may be a string of alphanumeric and/or other characters or similar data elements representing an identifier of a user and/or the user's account, a data element representing a biometric identifier of the user, etc. For example, a suitable payment account and/or payment instrument may be, but is not limited to, a debit account/debit card, a credit account/credit card, a Paypal® account, a prepaid value account and/or prepaid credit card, a private label account/card, a store account/card, any other payment card type, etc. Suitably, a payment instrument or payment card may belong to any of various payment networks or brands, for example, without limitation, Visa®, Mastercard®, Discover®, American Express®, etc. As may be appropriate for the type of account and/or instrument used in connection with a given transaction, the PAN may be but is not limited to, e.g., a credit card, debit card or other card or account number, an e-mail address or other account identifier, etc. It is to be appreciated that generally the user's payment account is held at and/or otherwise established with and/or the payment instrument is issued to the user by some other party, e.g., such a bank or financial institution or some other suitable third party that provides payment (e.g., from the associated account) when the transaction is settled. For ease of reference herein, this other party shall be referred to as the payment account or payment instrument issuer or simply the issuer or issuing party.

In general, according to suitable embodiments described herein, when a user wishes to execute a transaction (e.g., such as a purchase of goods and/or services from a merchant on-line), the PAN is entered and/or otherwise securely obtained over the telecommunications network by a trusted tokenization service provider (TTSP). In turn, the obtained PAN is ultimately replaced with a suitable token that is used to complete the transaction. Suitably, the merchant (or the merchant's payment processor if one is being employed) does not receive or have access to the submitted PAN. That is to say, throughout processing of the transaction as described herein, the PAN remains generally unknown and/or unavailable to the merchant or other payment processor.

Figure 9:
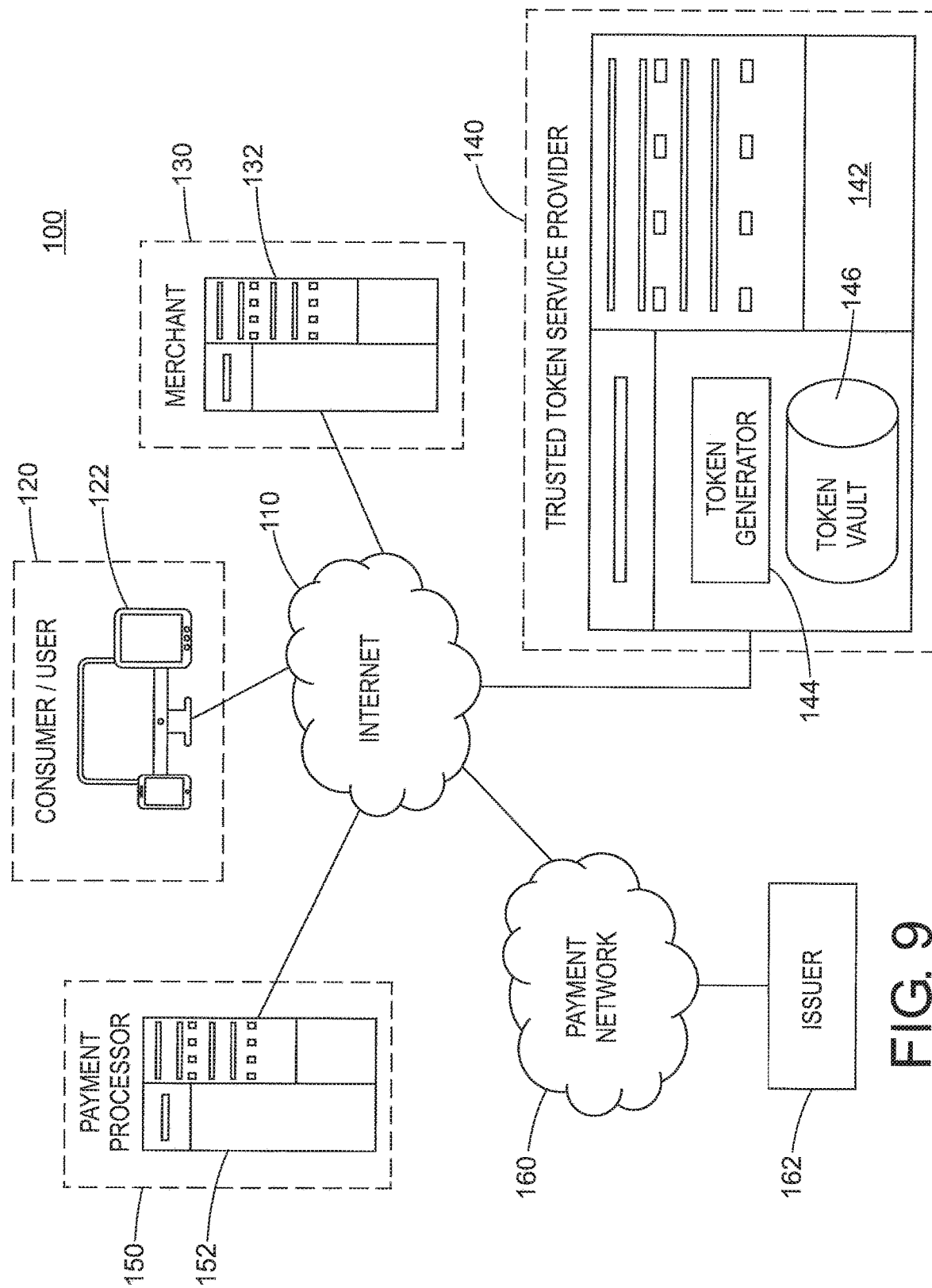
FIG. 9 is diagrammatic illustration showing an exemplary network environment suitable for practicing aspects of the present inventive subject matter.

With reference now to FIG. 9, there is shown an exemplary network environment 100 suitable for practicing aspects of the present inventive subject matter. In generally, various parties (e.g., a consumer 120, a merchant 130, a TTSP 140, and an optional payment processor 150) communicate over a telecommunications network 110, e.g., such as the Internet or some other similar data and/or packet switched network that is generally public and/or open.

In practice, the consumer or other like user 120 (i.e., suitably a cardholder or account holder) employs an end user device 122 operatively connected to the network 110 to initiate an on-line transaction with the merchant 130 (e.g., to make a purchase from the merchant 130 over the network 110). Optionally, the end user device 122 may be a laptop, desktop or tablet computer, a smartphone, etc. running a suitable web browser or the like thereon to access a website of the merchant 130. As shown, the merchant's website is made available to the consumer via a computer and/or other suitable hardware and/or electronic computing and/or data processing equipment 132 operatively connected to the network 110. For example, the equipment 132 may be provisioned or otherwise programmed as a web server or the like which selectively provides one or more requested webpages over the network 110, the collection of webpages comprising the merchant's website.

In practice, having selected that which the consumer 120 wishes to purchase from the merchant's website, the consumer 120 navigates with the browser on their device 122 to a "check out page" of the merchant's website. Suitably, in accordance with one or more of the exemplary embodiments described herein, the "check out page" may in fact be a hosted payment page or hosted order page (HOP). In essence, upon navigating to the "check out page," the browser on the consumer's end user device 122 is redirected to a separate, secure website and/or page to enter their confidential and/or sensitive payment data, including the PAN of the payment account or instrument they wish to use to make the purchase and/or otherwise complete the on-line transaction. Suitably, the page (or pages) of the HOP have the same look and feel as the merchant's website, but are in fact hosted by a trusted third party such that the merchant 130 never receives, touches or has access to or visibility to the payment data or the entered PAN. In one optional variation, hosted order fields are used, whereby the payment or order page is still hosted by the merchant, but the actual field or fields where the consumer enters their payment data (including the PAN) are served up by the trusted third party.

Suitably, the HOP or the like used to enter the PAN is provided by the TTSP 140. As shown, the HOP is made available to the consumer via a computer and/or other suitable hardware and/or electronic computing and/or data processing equipment 142 operatively connected to the network 110. For example, the equipment 142 may be provisioned or otherwise programmed as a web server or the like which selectively provides the HOP (or hosted order fields) over the network 110 to the browser running on the consumer's end user device 122. Accordingly, the consumer 120 may employ the browser running on their device 122 to enter their PAN into the received HOP; and consequently the PAN is thus obtained and/or otherwise collected by the TTSP 140.

Having received the PAN, the TTSP 140 produces a corresponding token. For example, the equipment 142 is optionally provisioned and/or programmed with (or otherwise has access to) a token generator 144 which generates a token for the received PAN. Alternatively, the received PAN is provided by the TTSP 140 to a payment network 160 and/or issuer 162 which in turn responds by returning a corresponding token to the TTSP 140. In either case, the TTSP 140 suitably stores and/or otherwise persists the obtained token securely, e.g., in a memory, database (DB) and/or other data storage device referred to herein as a token vault 146. Optionally, the token is stored along with and/or otherwise indexed to the associated PAN for which the token was produced. Accordingly, by having either a PAN or a token, the TTSP 140 may access the vault 146 to retrieve the corresponding counterpart token or PAN as the case may be.

Optionally, the merchant 130 may employ a third party payment processor 150 or the like to assist with the processing of payments on behalf of the merchant 130. Accordingly, the payment processor 150 may in essence step into the shoes of and/or fulfill one or more specific roles of the merchant 130 as may be the case in connection with the various embodiments described herein. As shown, the payment processor 150 may communicate with other parties over the network 110 via a computer and/or other suitable hardware and/or electronic computing and/or data processing equipment 152 operatively connected to the network 110.

In any event, having acquire and/or produced a token for the collected or otherwise received PAN, the token is used to complete the transaction, e.g., according to one of the following exemplary methods and/or processes.

With reference now to FIG. 1, there is shown one exemplary message flow which embodies one or more aspects of the present inventive subject matter.

As shown (in step 1), a consumer or other like user 120 (i.e., suitably a cardholder or accountholder) enters their PAN into a hosted order page (HOP) 148 of the TTSP 140.

In response (at step 2), the HOP 148 invokes a request for a token from the TTSP 140. In practice, the request includes the PAN entered into the HOP 148.

Upon receiving the request, the TTSP 140 checks (at step 3) to see if a token already exists for the received PAN, e.g., in a token vault 146. For the purposes of example, it is assumed that this is an initial transaction and the token does not yet exist.

Accordingly, (at step 4) the TTSP 140 generates a token (e.g., using a token generator 144) and optionally stores or otherwise persists it, e.g., in the token vault 146. It is to be appreciated that maintaining the generated token in this manner enables multiple uses of the token.

Next (at step 5), the TTSP 140 provides a merchant 130 with the generated token for further use in connection with the transaction, e.g., by posting the token to the merchant's web site 134.

Having received the token, the merchant submits (at step 6) a Transaction Authorization Request (TAR) using and/or including the token received from the TTSP 140. Notably, the merchant never sees the user's PAN.

The TTSP 140 intercepts or otherwise receives the TAR containing the token and swaps (at step 7) the token provided by the merchant 130 in the TAR with the corresponding PAN previously received in connection with the token request (i.e., in step 2). Suitably, the TTSP 140 uses the token contained in the TAR to look up and retrieve the corresponding PAN from the vault 146.

Having replaced the token with the corresponding PAN, the TTSP 140 forwards and/or otherwise submits (at step 8) the TAR (with the PAN) to the appropriate payment network 160 and/or the issuer 162.

In turn (at step 9), the payment network 160 and/or issuer 162 responds to the TAR from the TTSP 140 accordingly, e.g., with an "authorized" or "declined" message (i.e., a TAR response including the PAN received with the TAR).

The TTSP 140 receives the TAR response and replaces the PAN included therein with the corresponding token (at step 10).

Next (at step 11), the TTSP 140 generates and/or forwards the TAR response with the token to the merchant 130, so that again the merchant 130 does not see PAN.

At this point (in step 12), the merchant 130 is free to complete the transaction with their customer 120 and may, for example, sent them an appropriate message indicating whether the transaction was authorized or declined.

Figure 2:
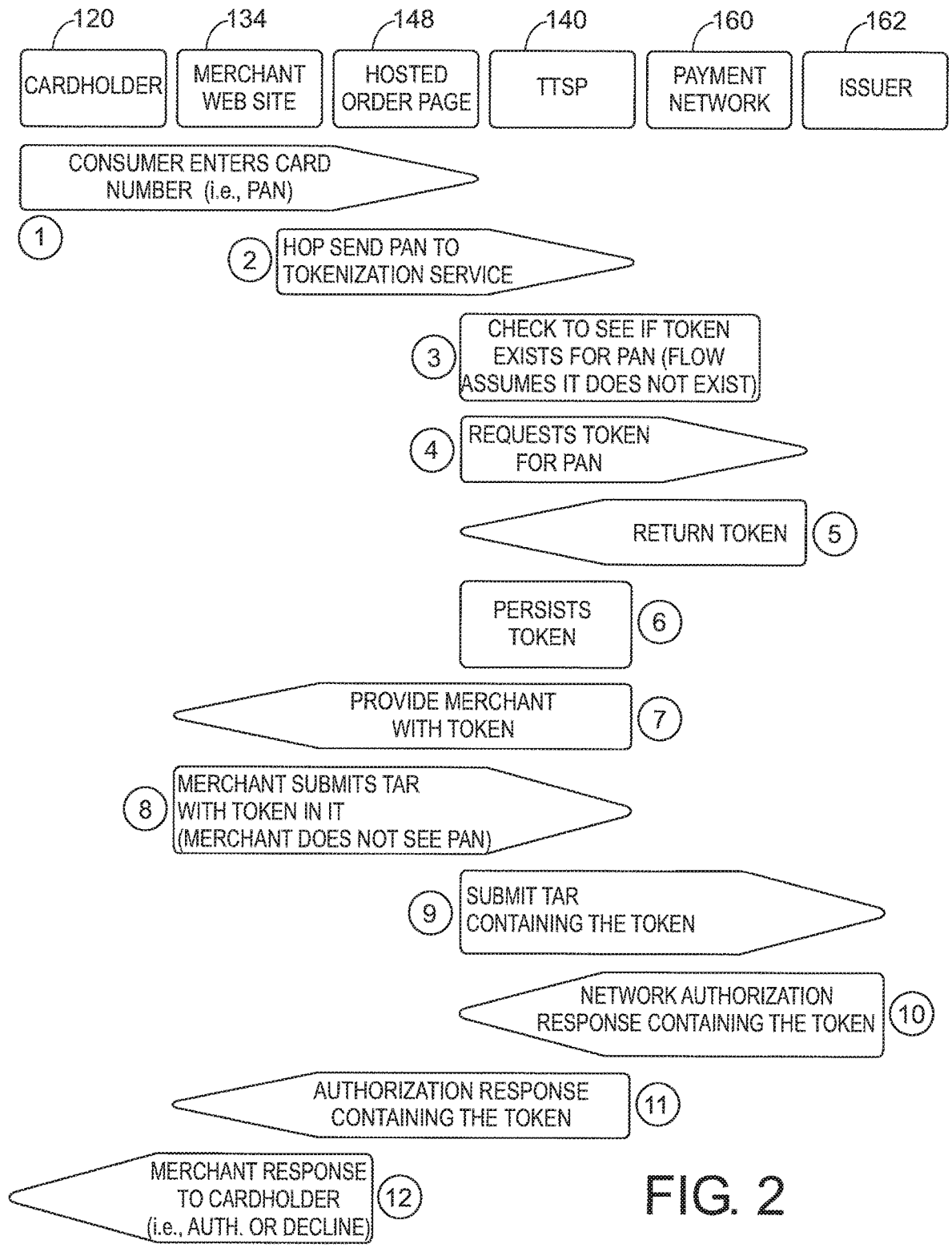
FIG. 2 is a diagrammatic illustration showing one variation of the embodiment shown in FIG. 1.

With reference now to FIG. 2, there is shown another exemplary embodiment, which is a variation of the one shown in FIG. 1.

Steps (1)-(3) of FIG. 2 are essentially the same as steps (1)-(3) in FIG. 1.

However, in the embodiment of FIG. 2, the TTSP 140 does not generate the token. Rather, in response to receiving the PAN via the HOP 148, the TTSP 140 requests a token from the payment network 160 for the PAN (at step 4). Suitably, the request for a token sent to the payment network 160 includes the PAN. Optionally, the TTSP 140 may provide additional information along with the request, e.g., including a device ID, IP (internet Protocol) address, reputation, history, etc.

In turn (at step 5), the payment network 160 acts as the token generator and generates a token for the PAN and returns the token to TTSP 140 in response to the request received therefrom.

Upon receipt of the token, the TTSP 140 stores and/or otherwise persists the token (at step 6), for example, in the token vault 146.

Next (at step 7), the TTSP 140 provides the merchant 130 with the token for use in connection with the transaction (e.g., by posting the token to the merchant's web site 134). Optionally, the TTSP 140 may provide the merchant 130 with additional information beyond just the token (e.g., reputation, history, score, etc.).

In response to receiving the token, the merchant 130 (at step 8) submits a TAR using the received token. Notably, the merchant does not see the PAN.

Next (at step 9), the TTSP 140 intercepts or otherwise receives the TAR (including the token) and forwards or otherwise submits the same to the payment network 160.

In turn (at step 10), the payment network 160 and/or issuer 162 replies with an appropriate response to the TAR, i.e., authorized or declined.

Next (at step 11), the TTSP 140 intercepts and/or otherwise receives the TAR response (with the token) and forwards or otherwise sends the same to the merchant 130, so that again the merchant does not see PAN.

At this point (in step 12), the merchant 130 is free to complete the transaction with their customer 120 and may, for example, sent them an appropriate message indicating whether the transaction was authorized or declined.

Figure 3:
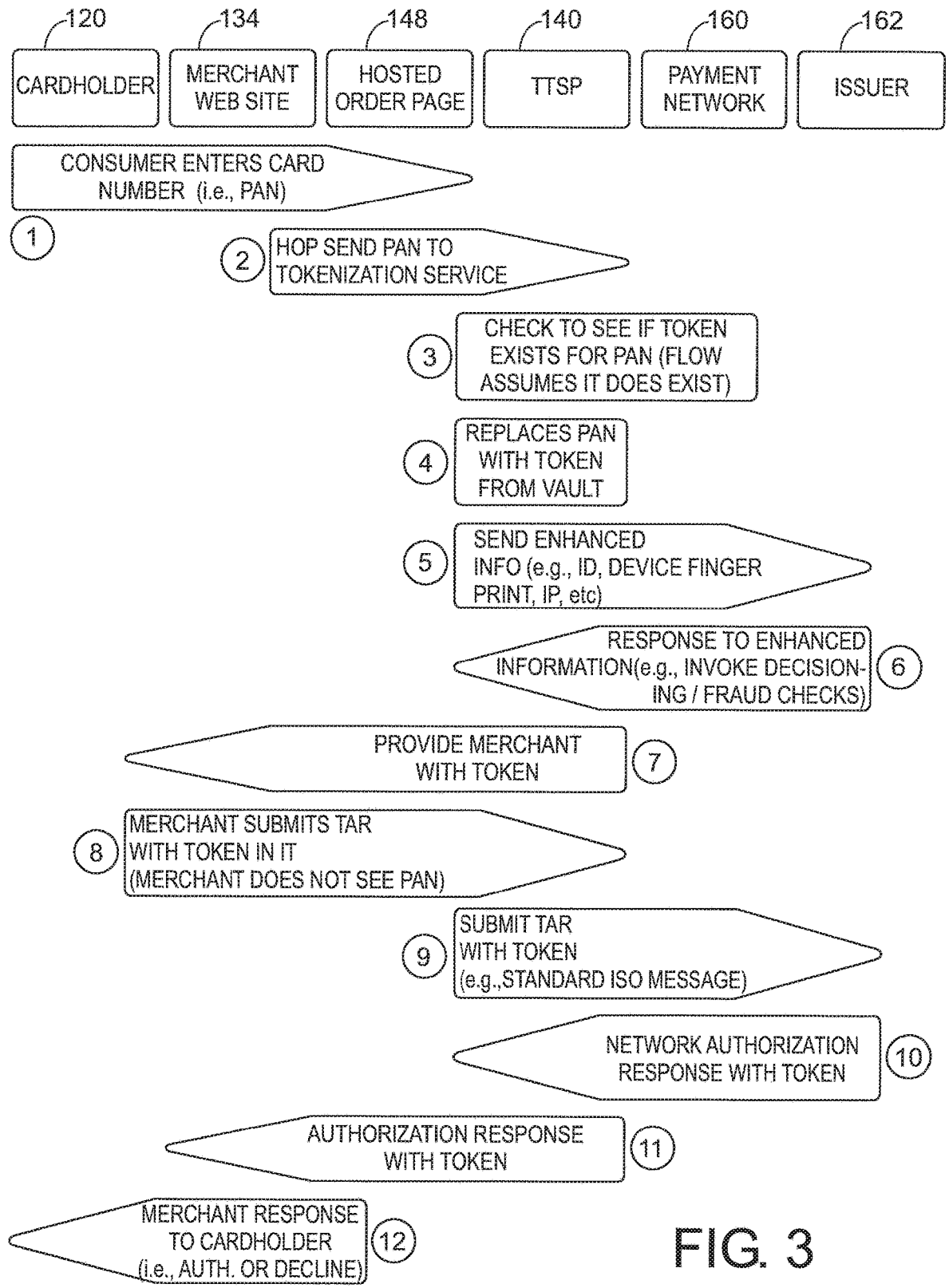
FIG. 3 is a diagrammatic illustration showing another variation of the embodiment shown in FIG. 1.

With reference now to FIG. 3, there is yet another embodiment shown. Again, this embodiment is similar to and/or a variation of the embodiment shown in FIG. 1. As before, steps (1)-(3) of the embodiment shown in FIG. 3 are similar to those of the embodiment shown in FIG. 1. However, for the present example, it is assumed (in step 3) that the token already exists for the PAN received by the TTSP 140, e.g., it may be stored and/or otherwise maintained in the token vault 146. Suitably, the token may have been generated and/or otherwise obtained (in a manner described herein) in connection with a prior transaction and was previously stored or otherwise persisted (e.g., in the token vault 146) for a subsequent use.

Accordingly (in step 4), the TTSP 140 responds to receipt of the PAN by retrieving the existing token, e.g., from the token vault 146, and replacing the received PAN with the retrieved token.

In turn (at step 5), the TTSP 140 sends the payment network 160 enhanced information (e.g., a device ID, fingerprint, IP address, etc.).

In response (at step 6), the payment network 160 returns a reply to the enhanced information. For example, the reply may trigger or invoke decisioning and/or certain fraud checks.

Next (at step 7), the TTSP 140 provides the merchant 130 with the token (e.g., retrieved from the token value 146) for use in connection with the transaction, e.g., by posting the token to the merchant's web site 134. Optionally, the TTSP 140 may provide the merchant 130 with additional information beyond just the token (e.g., reputation, history, score, etc.).

In response to receiving the token, the merchant 130 (at step 8) submits a TAR using the received token. Notably, the merchant still does not see the PAN.

Next (at step 9), the TTSP 140 intercepts or otherwise receives the TAR (including the token) and forwards or otherwise submits the same to the payment network 160. Optionally, the TAR along with the accompanying token may be submitted to the payment network 160 using a standard International Organization for Standardization (ISO) message.

In turn (at step 10), the payment network 160 and/or issuer 162 replies with an appropriate response to the TAR, i.e., authorized or declined. Suitably, the token accompanies the TAR response.

Next (at step 11), the TTSP 140 intercepts and/or otherwise receives the TAR response (with the token) and forwards or otherwise sends the same to the merchant 130, so that again the merchant does not see PAN.

At this point (in step 12), the merchant 130 is free to complete the transaction with their customer 120 and may, for example, sent them an appropriate message indicating whether the transaction was authorized or declined.

Figure 4:
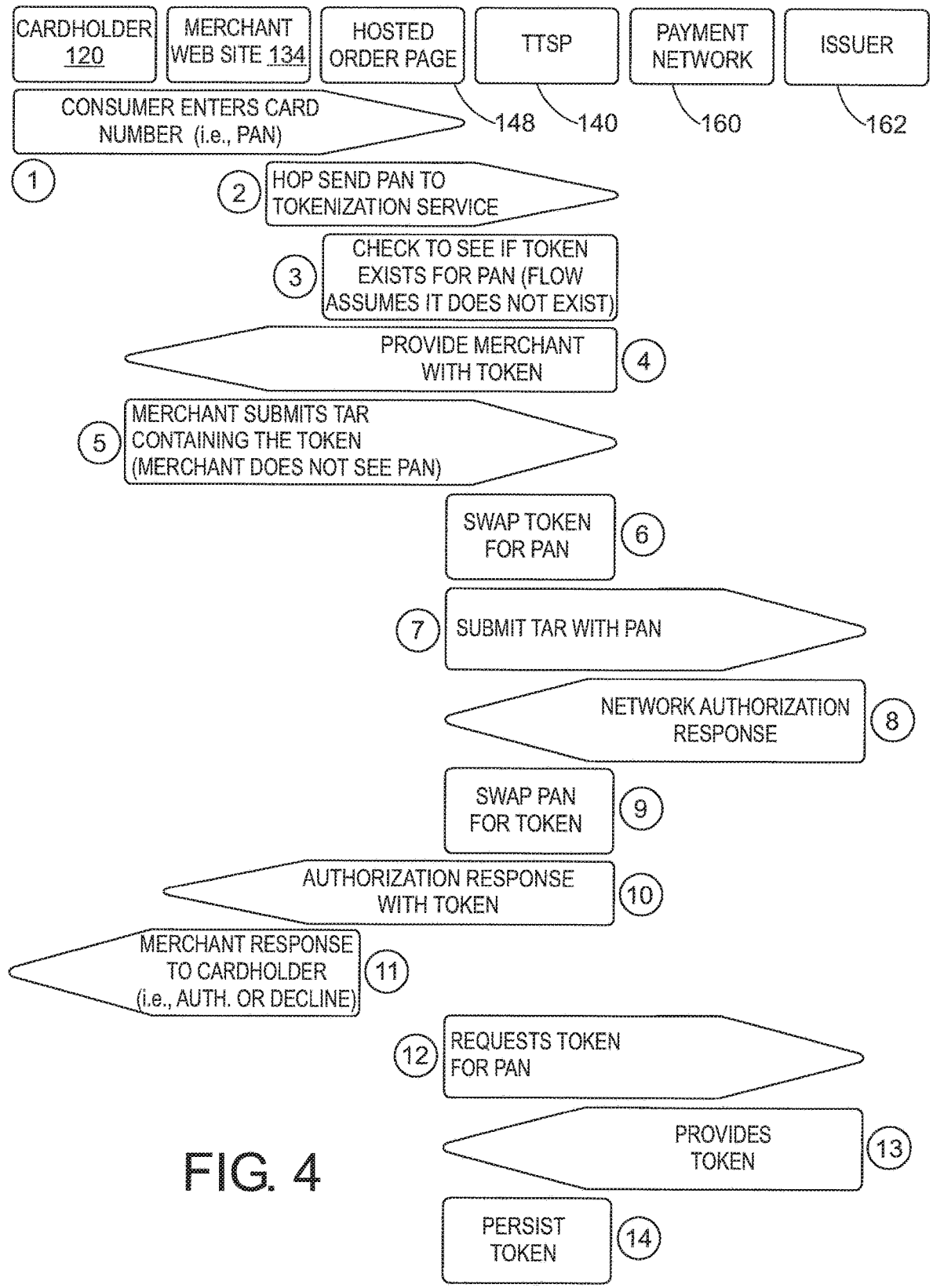
FIG. 4 is a diagrammatic illustration showing still another variation of the embodiment shown in FIG. 1.

With reference now to FIG. 4, there is shown yet another embodiment. Again, this embodiment is similar to and/or a variation of the embodiment shown in FIG. 1. As before, steps (1)-(3) of the embodiment shown in FIG. 4 are similar to those of the embodiment shown in FIG. 1.

Suitably, in this embodiment, the TTSP 140 produces and/or generates and/or otherwise obtains a first token (e.g., from a token generator 144); and as shown (in step 4), provides the same to the merchant 130 (e.g., by posting it to the merchant's web site 134).

In response, the merchant 130 submits (at step 5) a TAR containing the first token. As with other embodiments, the merchant does not see PAN.

As shown (at step 6), the TTSP 140 intercepts and/or otherwise receives the TAR containing the first token, and swaps out the first token, replacing it with the PAN (e.g., received via the HOP 148).

In turn, the TTSP 140 submits (at step 7) the TAR to the payment network 160 (or issuer 162) with the PAN.

In reply (at step 8), the payment network 160 (or issuer 162 as the case may be) provides an appropriate response to the TAR (e.g., authorized or declined). Suitably, the response is accompanied by the PAN.

The TTSP 140 receives the TAR response, and (at step 9) swaps out the PAN, replacing it with the corresponding first token.

Having swapped out the PAN with the first token, the TTSP 140 communicates (at step 10) the TAR response to the merchant 130, with the response now containing the first token (i.e., the merchant does not receive or see the PAN).

At this point (in step 11), the merchant 130 is free to complete the transaction with their customer 120 and may, for example, sent them an appropriate message indicating whether the transaction was authorized or declined.

Next as shown (in step 12), the TTSP 140 requests a second token for the PAN from the payment network 160.

In reply (at step 13), the payment network 160 provides the TTSP 140 with a second token produced, generated and/or otherwise obtained by the payment network 160.

Having received the second token from the payment network 160, the TTSP 140 stores and/or otherwise persists the second token, e.g., in the existing token vault 146 where it remains available for a next use.

Figure 5:
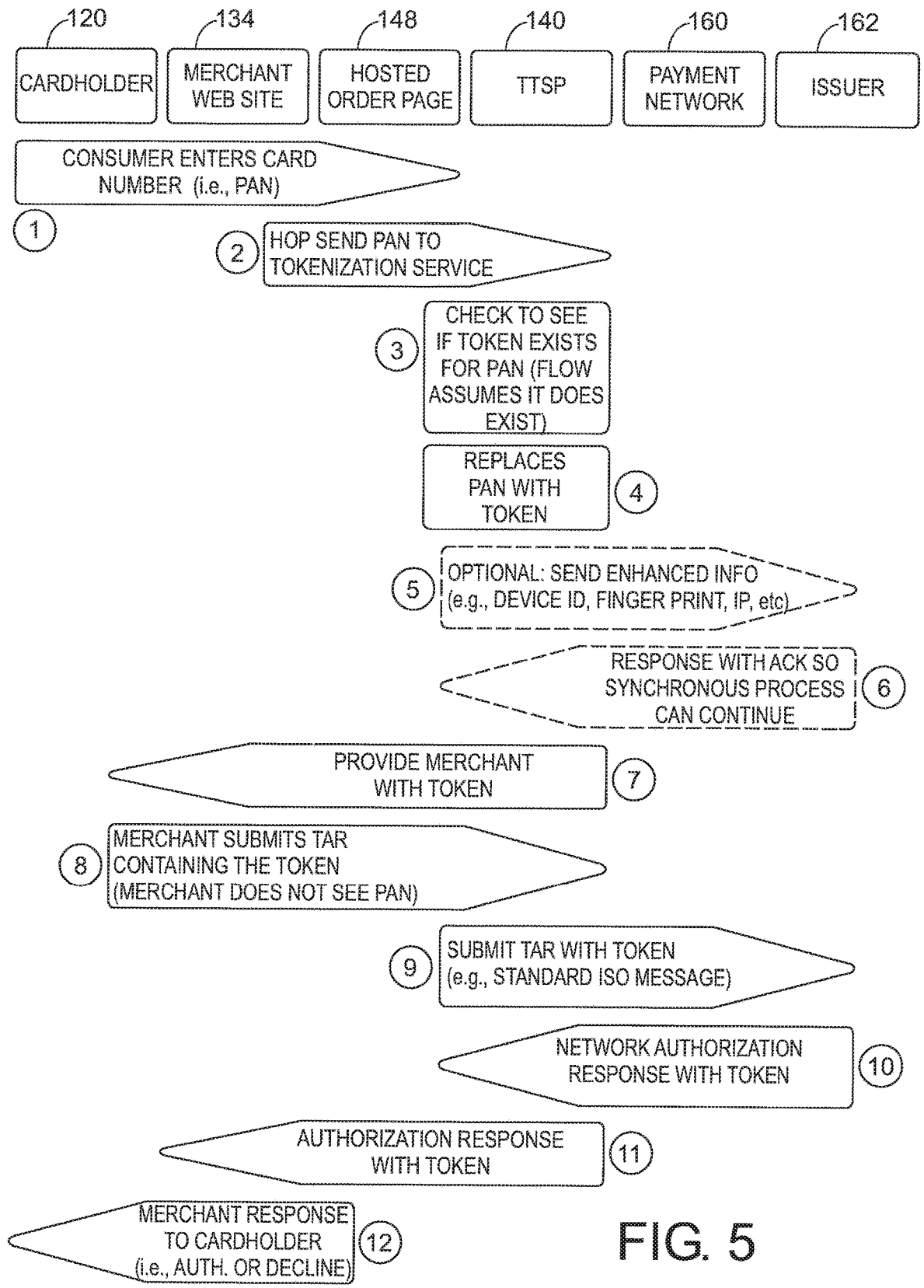
FIG. 5 is a diagrammatic illustration showing a variation of the embodiment shown in FIG. 3.

Turning attention now to FIG. 5, still another exemplary embodiment is shown which is similar to and/or a variation of the embodiment shown in FIG. 3. As before, steps (1)-(12) of the embodiment shown in FIG. 5 are similar to those of the embodiment shown in FIG. 3.

As shown in the embodiment of FIG. 5, steps (5) and (6) are optional. At step (5), the TTSP 140 may pause the transaction in order to pass enhanced and/or augmented information to the payment network 160. This enhanced or augmented information provides the payment network 160 advance notice that the TAR is inbound and gives the payment network 160 a time window to potentially invoke additional decissioning and/or fraud check measures. At step (6), the payment network 160 responds to receipt of the enhanced and/or augmented information with an acknowledgement. In this manner, the TTSP 140 is made aware that the sent information was received by the payment network 160 and that the synchronous process can continue. Of course, if the enhanced/augmented information was not received by the payment network 160 or if the message of step (5) fails to properly send or if the acknowledgement is not received within some timeout period, then the process may simply continue to step (7).

Figure 6:
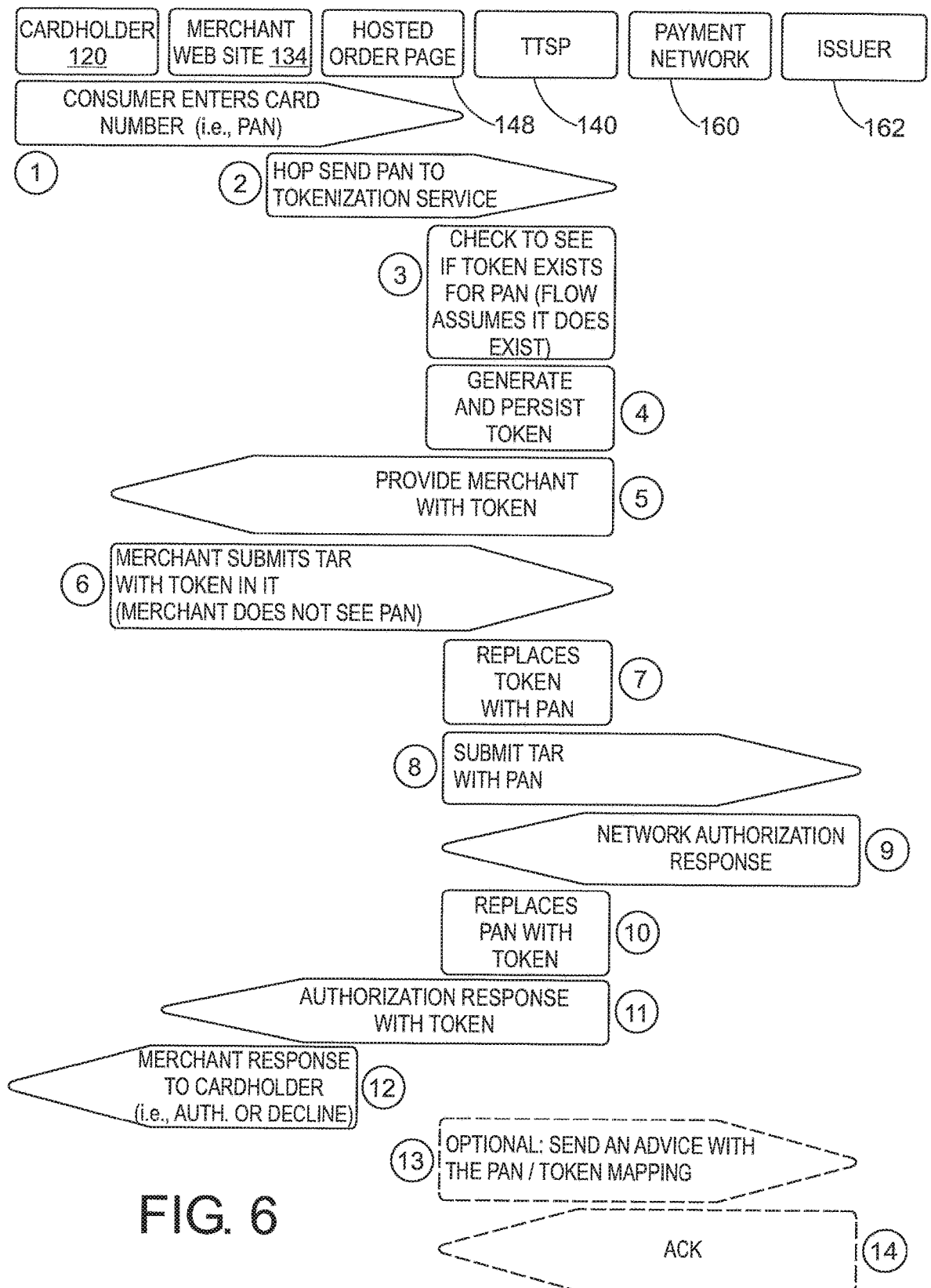
FIG. 6 is a diagrammatic illustration showing another variation of the embodiment shown in FIG. 1.

With reference now to FIG. 6, another exemplary embodiment is shown which is similar to and/or a variation of the embodiment shown in FIG. 1. As before, steps (1)-(3) of the embodiment shown in FIG. 6 are similar to those of the embodiment shown in FIG. 1.

In the present embodiment, suitably, the TTSP 140 acts as the token generator, and accordingly (at step 4), the TTSP 140 creates an enhanced token and persists the token, e.g., in the token vault 146. In practice, the TTSP 140 may generate the enhanced token (e.g., using the token generator 144) with enhanced information.

In turn (at step 5), the TTSP 140 supplies the merchant 130 with the enhanced token which, e.g., provides the merchant 130 with additional information about the customer, information about the device the customer is using or information about the PAN (without actually supplying the PAN), etc.

Having received the enhanced token, the merchant 130 submits (at step 6) a TAR containing the enhanced token (note, the merchant 130 does not see the PAN).

As shown (at step 7), the TTSP 140 intercepts and/or otherwise receives the TAR containing the enhanced token, and swaps out the token, replacing it with the PAN (e.g., received via the HOP 148).

In turn, the TTSP 140 submits (at step 8) the TAR to the payment network 160 (or issuer 162) with the PAN.

In reply (at step 9), the payment network 160 (or issuer 162 as the case may be) provides an appropriate response to the TAR (e.g., authorized or declined). Suitably, the response is accompanied by the PAN.

The TTSP 140 receives the TAR response, and (at step 10) swaps out the PAN, replacing it with the corresponding token.

Having swapped out the PAN with the token, the TTSP 140 communicates (at step 11) the TAR response to the merchant 130, with the response now containing the token (i.e., the merchant does not receive or see the PAN).

At this point (in step 12), the merchant 130 is free to complete the transaction with their customer 120 and may, for example, sent them an appropriate message indicating whether the transaction was authorized or declined.

Optionally, the TTSP 140 sends (at step 13) the payment network 160 an "Advice" or other suitable message with a PAN/token mapping that correlates the PAN with the associated token used for the transaction; and (at step 14) the payment network 160 returns an acknowledgement confirming receipt of the PAN/token mapping.

Figure 7:
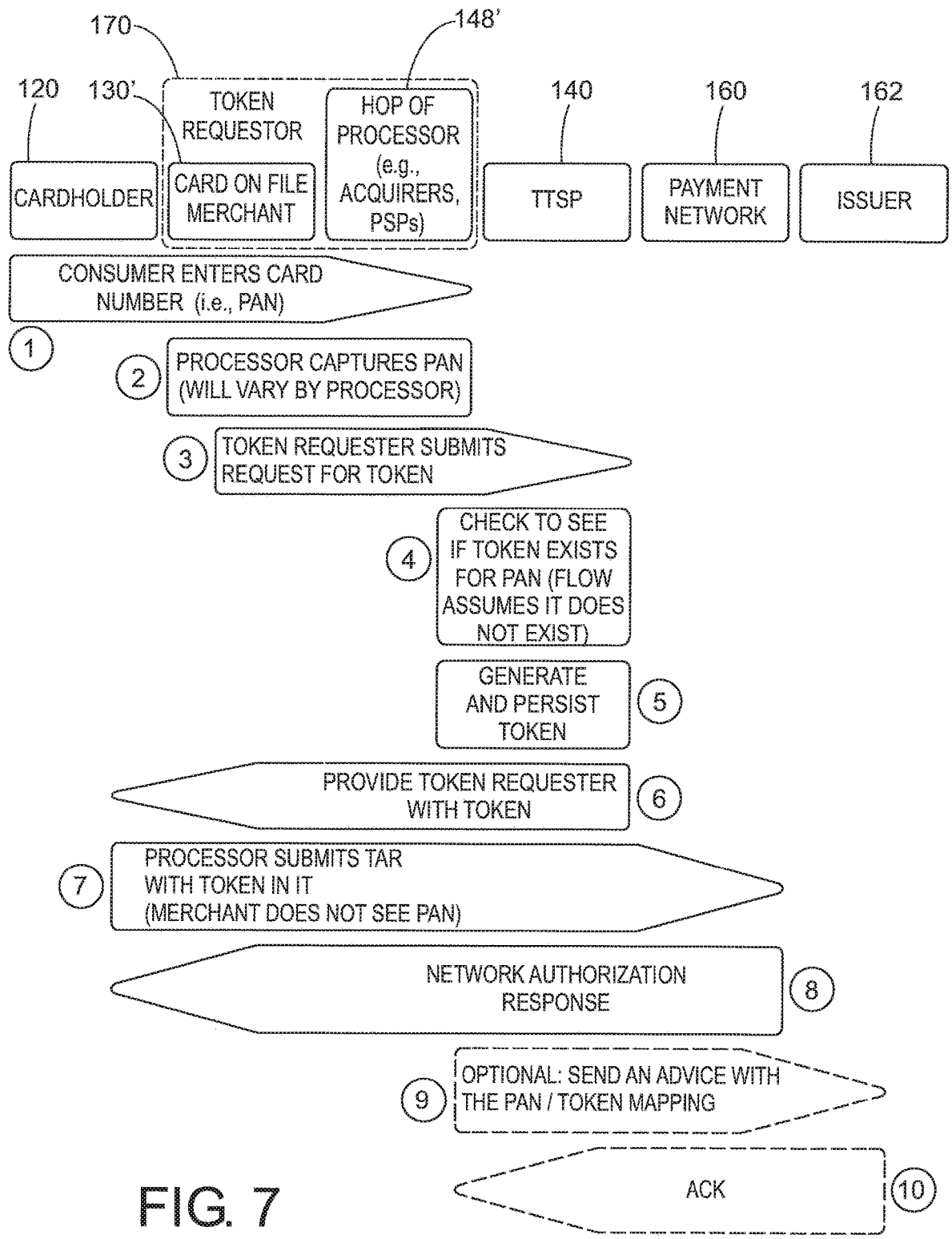
FIG. 7 is a diagrammatic illustration showing another embodiment of message and/or signal flows in accordance with another exemplary process and/or method for tokenization of a PAN in accordance with aspects of the present inventive subject matter.

With reference now to FIG. 7, yet another embodiment is shown.

In the current embodiment, the consumer or other like user 120 (i.e., suitably a cardholder or accountholder) optionally enters (at step 1) their PAN into an order page or HOP 148' of a payment processor 150; and (at step 2) the payment processor captures the PAN. Alternately, the merchant 130 may have card and/or account information already on file for the user 120, e.g., the card and/or account information may be stored by the merchant 130 and/or previously submitted to the merchant, hence the merchant is referred to as a card on file merchant 130'. More generally, the foregoing can be referred to as a token requestor 170.

In turn (at step 3), the token requestor 170 (e.g., payment processor 150 or card on file merchant 130' as the case may be) submits a request to the TTSP 140 for a token, the request including the PAN for which the token is being sought.

In response to receipt of the request, the TTSP 140 checks (at step 4) to see if a token already exists for the received PAN, e.g., in the token vault 146. For the purposes of the present example, it is assumed that this is an initial transaction and the token does not yet exist.

Accordingly, (at step 5) the TTSP 140 generates a token (e.g., using the token generator 144) and optionally stores or otherwise persists it, e.g., in the token vault 146. Optionally, the TTSP 140 may generate a token with enhanced information; and can also demand that third parties use the enhanced service (i.e., optionally provide fingerprint, IP address, etc.).

In turn (at step 6), the TTSP 140 supplies the requestor 170 (e.g., the payment processor 150) with the token. Optionally, the supplied token may be an enhanced token which, e.g., provides the requestor with additional information about the customer 120, information about the device the customer 120 is using or information about the PAN (without actually supplying the PAN), etc.

Having received the token, the payment processor 150 submits (at step 7) the TAR (with the token) to the payment network 160 (or the issuer 162).

In reply (at step 8), the payment network 160 provides an appropriate response to the TAR (i.e., authorized or declined).

Optionally, the TTSP 140 sends (at step 9) the payment network an "Advice" or other suitable message with a PAN/token mapping that correlates the PAN with the associated token used for the transaction; and (at step 10) the payment network 160 returns an acknowledgement confirming receipt of the PAN/token mapping.

Figure 8:
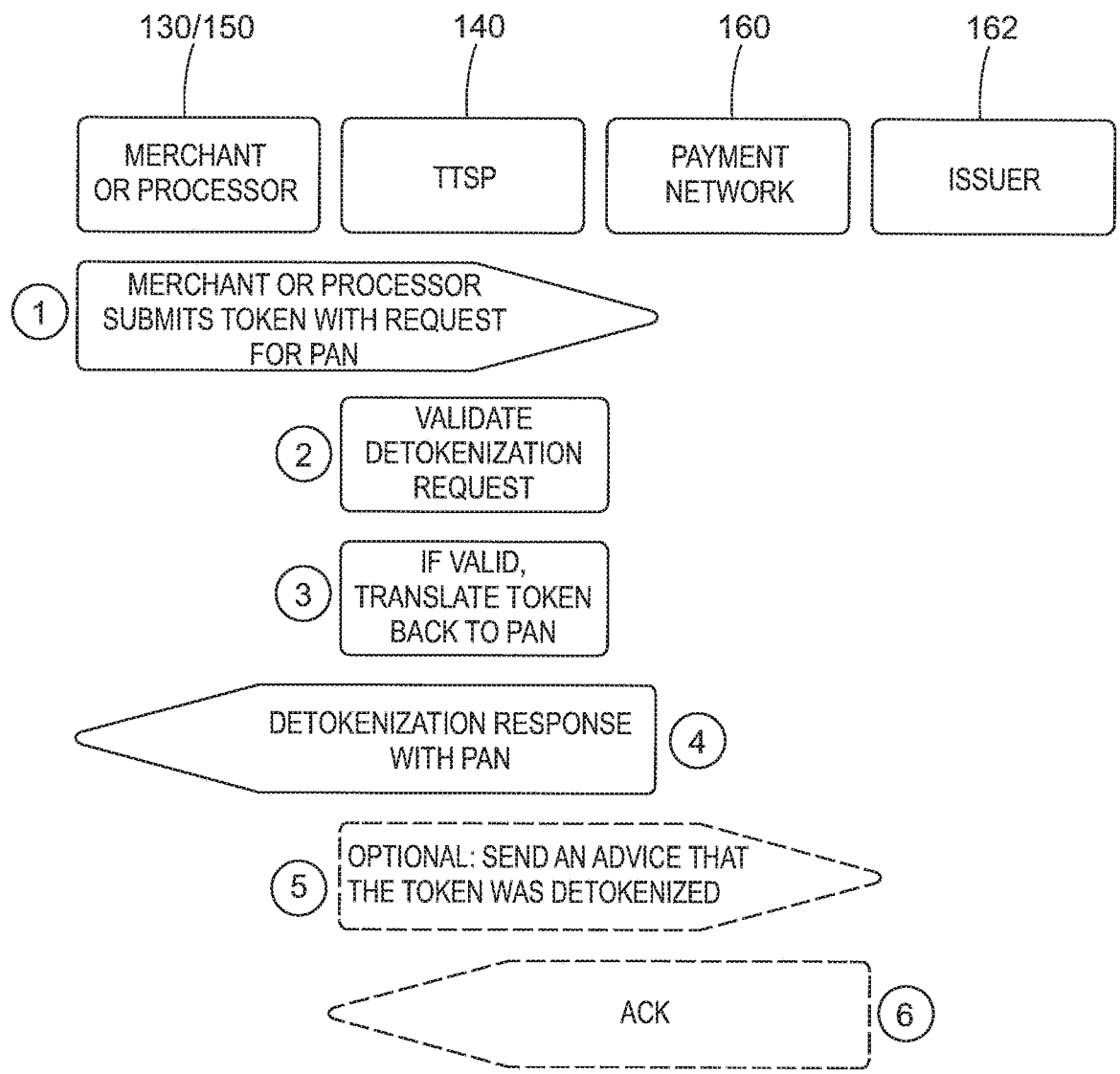
FIG. 8 is a diagrammatic illustration showing an embodiment of message and/or signal flows in accordance with an exemplary processes and/or methods for de-tokenization which embodies aspects of the present inventive subject matter.

Suitably, the TTSP 140 is also provisioned to provide de-tokenization services, in which a PAN is recovered from an associated token. An exemplary embodiment of the same is shown in FIG. 8.

As shown (in step 1), a merchant 130 or payment processor 150 (i.e., requestor 170) submits a token along with a request for its associated PAN.

Upon receipt of the token and/or request, the TTSP 140 (at step 2) validates that the requestor is authorized to receive the PAN. Of course, various events and/or responses can be triggered if the received token is invalid or the requestor 170 is an unauthorized party.

However, if the requestor 170 and token are valid, the TTSP 140 (at step 3) translates the token back into the PAN, e.g., by retrieving the associated PAN from the token vault 146. Alternatively, if the token and/or requestor are invalid, the request is denied and an advice or other suitable alert or notification may be made to the payment network 160, issuer 162 and/or other concerned parties.

Assuming the token and requestor 170 are valid, then (at step 4) the recovered PAN is returned to the requestor 170 (e.g., the merchant 130 or processor 150)

Optionally, the TTSP 140 (at step 5) advises and/or otherwise informs the payment network 160 that the token was de-tokenized; and (at step 6) the payment network 160 acknowledges receipt of this notification.

Various aspects of the present inventive subject matter have been described herein with reference to exemplary and/or preferred embodiments. Obviously, modifications and alterations will occur to others upon reading and understanding the preceding detailed description. It is intended that the inventive subject matter be construed as including all such modifications and alterations insofar as they come within the scope of the appended claims or the equivalents thereof.

The above methods, system, platforms, modules, processes, algorithms and/or apparatus have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the inventive subject matter be construed as including all such modifications and alterations insofar as they come within the scope of the appended claims or the equivalents thereof.

What is claimed is:

1. A method of obscuring a value of a sensitive data element, said method comprising:
    receiving, by a merchant website hosted by a merchant and from a consumer device, a transaction initiation message to initiate an online transaction;
    in response to receiving the transaction initiation message, redirecting a browser of the consumer device to a secure website not hosted by the merchant to effect processing of the online transaction by:
  receiving, by the secure website and from the consumer device, the sensitive data element;
  generating, by the secure website,
    a token request to a tokenization service provider processor, the token request comprising the sensitive data element; and
    communicating, by the secure website and to the tokenization service provider processor, the token request;
in response to the tokenization service provider processor determining that a token correlated with the sensitive data element does not already exist in a memory device of the tokenization service provider, receiving, by the merchant website and from the tokenization service provider processor, a token corresponding to the sensitive data element;
generating, by the merchant website, an authorization request comprising the token, the authorization request not containing the sensitive data element;
communicating, by the merchant website and to a payment network, the authorization request; and
receiving, by the merchant website and from the payment network, an authorization response to the authorization request.

2. The method of claim 1, wherein the sensitive data element is not received by the merchant website.

3. The method of claim 1, wherein the merchant website and the tokenization service provider processor are operated by separate entities.

4. The method of claim 1, wherein the sensitive data element is one of a primary account number, a credit card number, a debit card number, an e-mail address, a biometric identifier, or an account indicator.

5. The method of claim 1, wherein the token further comprises at least one of additional information about a user associated with the sensitive data element, information about a device of the user, or information about the sensitive data element which information does not actually include the value thereof.

6. The method of claim 5, wherein the additional information comprises a device ID, fingerprint data, or an IP address.

7. The method of claim 1, further comprising:
  sending, by the tokenization service provider processor, the payment network a message which maps the token and the sensitive data element to one another.

8. The method of claim 1, wherein the merchant website comprises a public data communications network.

9. A system for obscuring a value of a sensitive data element, comprising a merchant system comprising a merchant website hosted by a merchant, the merchant website programmed or configured to:
  receive, from a consumer device, a transaction initiation message to initiate an online transaction;
  in response to receiving the transaction initiation message, redirect a browser of the consumer device to a secure website not hosted by the merchant to effect processing of the online transaction by:
    receiving, by the secure website and from the consumer device, the sensitive data element;
    generating, by the secure website,
      a token request to a tokenization service provider processor, the token request comprising the sensitive data element; and
      communicating, by the secure website and to the tokenization service provider processor, the token request;
  in response to the tokenization service provider processor determining that a token correlated with the sensitive data element does not already exist in a memory device of the tokenization service provider, receive, from the tokenization service provider processor, a token corresponding to the sensitive data element;
  generate an authorization request comprising the token, the authorization request not containing the sensitive data element;
  communicate, to a payment network, the authorization request; and
  receive, from the payment network, an authorization response to the authorization request.

10. The system of claim 9, wherein the sensitive data element is not received by the merchant website.

11. The system of claim 9, wherein the merchant website and the tokenization service provider processor are operated by separate entities.

12. The system of claim 9, wherein the sensitive data element is one of a primary account number, a credit card number, a debit card number, an e-mail address, a biometric identifier, or an account indicator.

13. The system of claim 9, wherein the token further comprises at least one of additional information about a user associated with the sensitive data element, information about a device of the user, or information about the sensitive data element which information does not actually include the value thereof.

14. The system of claim 13, wherein the additional information comprises a device ID, fingerprint data, or an IP address.

15. The system of claim 9, wherein the tokenization service provider processor is configured to communicate to the payment network a message which maps the token and the sensitive data element to one another.

16. The system of claim 9, wherein the merchant website comprises a public data communications network.

* * * * *